US007963109B2

(12) United States Patent
Nagaoka et al.

(10) Patent No.: US 7,963,109 B2

(45) Date of Patent: Jun. 21, 2011

(54) GUIDE STRUCTURE AND EXHAUST GAS PURIFICATION DEVICE

(75) Inventors: Daiji Nagaoka, Fujisawa (JP); Masashi Gabe, Fujisawa (JP)

(73) Assignee: Isuzu Motors Limited, Tokyo (JP)

(*) Notice: Subject to any disclaimer, the term of this patent is extended or adjusted under 35 U.S.C. 154(b) by 874 days.

(21) Appl. No.: 11/659,375

(22) PCT Filed: Jul. 26, 2005

(86) PCT No.: PCT/JP2005/013627

§ 371 (c)(1), (2), (4) Date: Feb. 5, 2007

(87) PCT Pub. No.: WO2006/027904

PCT Pub. Date: Mar. 16, 2006

(65) Prior Publication Data

US 2008/0072580 A1 Mar. 27, 2008

(30) Foreign Application Priority Data

Sep. 9, 2004 (JP) ................................ 2004-262465

(51) Int. Cl.

*F01N 3/00* (2006.01)
*F01N 3/10* (2006.01)
*F01N 1/00* (2006.01)

(52) U.S. Cl. ............................... 60/324; 60/276; 60/301

(58) Field of Classification Search .................... 60/276, 60/285, 295, 301, 303, 324

See application file for complete search history.

(56) References Cited

U.S. PATENT DOCUMENTS 5,484,575 A * 1/1996 Steenackers .................. 422/176
2001/0026780 A1 10/2001 Reuther et al.
2002/0062562 A1* 5/2002 Li et al. ........................... 29/890
2004/0154285 A1* 8/2004 Nagaoka et al. ................ 60/285
2004/0197242 A1* 10/2004 Holden et al. ................ 422/179
2005/0086933 A1* 4/2005 Nieuwstadt et al. ............ 60/297

FOREIGN PATENT DOCUMENTS

CN 1521390 8/2004
DE 88 04 803 9/1989
EP 453 062 10/1991
EP 1 445 441 8/2004
JP 5-941 1/1993
JP 5-77560 10/1993
JP 6-26375 2/1994
JP 6-101516 4/1994
JP 9-25841 1/1997
JP 10-121945 5/1998

(Continued)

OTHER PUBLICATIONS

Dougahara et al., Machine Translation of JP 11-229864 A.*

(Continued)

*Primary Examiner* — Thomas E Denion
*Assistant Examiner* — Audrey Klastrerka
(74) *Attorney, Agent, or Firm* — Staas & Halsey LLP

(57) ABSTRACT

Structure for guiding exhaust gas flow to an exhaust gas sensor in exhaust gas purification device installed in an exhaust passage, wherein a plurality of exhaust gas purification units is disposed in series in a container, the exhaust gas sensor is installed between the exhaust gas purification units and guide plates/pipes direct the exhaust gas flowing to the sensor to increase the exhaust gas sensor's responsiveness.

8 Claims, 7 Drawing Sheets

42 32 Ge 40 41 1 41 30 60 10A A A 21a 21 21b 31 50A 55 G 20 22 56 54 51 52 53 57 Gc

FOREIGN PATENT DOCUMENTS

| | | | |
|---|---|---|---|
| JP | 11-229864 | | 8/1999 |
| JP | 2000-64832 | | 2/2000 |
| JP | 2001-227333 | | 8/2001 |
| JP | 2001323812 A | * | 11/2001 |
| JP | 2002-089245 | | 3/2002 |
| JP | 2002-235540 | | 8/2002 |
| JP | 2003-129881 | | 5/2003 |
| JP | 2004-225657 | | 8/2004 |
| JP | 2004-239218 | | 8/2004 |

OTHER PUBLICATIONS

Aichi Kikai Kogyo KK, Machine Translation of JP 09-025841 A.*
Yamamoto, Machine Translation of JP 2000-064832 A.*
Aichi Kikai Kogyo KK, English Abstract of JP 09-025841 A.*
Yamamoto, English Abstract of JP 2000-064832 A.*
Takahashi, English Abstract of JP 06-101516 A.*
Ishii et al., English Abstract of JP 10-121945 A.*
Dougahara et al., English Abstract of JP 11-229864 A.*
Dictionary.com, Definiton of "Solid", received May 26, 2010.*
Office Action issued Mar. 28, 2008 in corresponding Chinese Patent Application No. 2005800303215.
Office Action issued in corresponding Japanese Patent Application No. 2004-262465.
International Search Report mailed Nov. 8, 2005 (International Application No. PCT/JP2005/013627, Filed Jul. 26, 2005).
Supplementary European Search Report dated Apr. 20, 2010 in European Application No. 05 76 7191.

* cited by examiner

10A
Gc
57
53
60
55
52
50A
51
54
56
32
30
A
A
31
21b
21
22
42
1
21a
G
20
Ge
40
41
41

GUIDE STRUCTURE AND EXHAUST GAS PURIFICATION DEVICE

This application claims the benefit under 35 U.S.C. §371, of PCT International Application Number PCT/JP2005/013627, filed Jul. 26, 2005 and Japanese Application No. 2004-262465, filed Sep. 9, 2004 in Japan, the contents of which are incorporated herein by reference.

FIELD OF THE INVENTION

The present invention relates to a guide structure for exhaust gas flow, and an exhaust gas purification device comprised of such, a guide structure, wherein a plurality of exhaust gas purification units are disposed in series in a catalyst container installed in the exhaust passage, and wherein an exhaust gas sensor is installed between the exhaust gas purification units in the exhaust gas purification device.

DESCRIPTION OF THE RELATED ART

A variety of research and proposals have been made regarding the use of NOx (nitrogen oxides) catalysts in the reduction and removal of NOx from the exhaust gas emitted by internal combustion engines, such as diesel engines and certain types of gasoline engines, and various combustion devices. One such catalyst is that of a NOx occlusion reduction type catalyst, a catalyst, which is used to reduce NOx emissions in diesel engines. Through the use of this NOx occlusion reduction type catalyst, the NOx in exhaust gases can be more effectively purified.

A NOx purification catalyst unit carrying this NOx occlusion reduction type catalyst has the structure shown in FIG. 8, comprised of a monolith honeycomb 30M or the like. The monolith honeycomb 30M structure is comprised of a cordierite or stainless steel carrying body 31 forming a multiplicity of polygonal cells 30S, as shown in FIG. 9. On the walls of the cells 30S, as shown in FIGS. 9 and 10, is applied a porous catalyst coat layer 34 of alumina ($Al_2O_3$) or zeolite, which acts as the catalyst-carrying layer. This catalyst-carrying layer 34 increases the surface contact area for the exhaust gas. Carried on the surface of catalyst coat layer 34 are carrying noble metal (catalytically active metal) 32 and NOx occlusion material (NOx occlusion substance; NOx occlusion agent; NOx adsorbent) 33. This structure generates the catalytic function in the NOx purification catalyst unit.

FIGS. 11 and 12 show the distribution of the catalytic materials 32 and 33 over the surface of the carrying layer in the NOx purification catalyst unit and the NOx occlusion reduction mechanism. In the NOx purification catalyst unit, catalyst-coat layer 34 carries oxidizing noble metal 32 and NOx occlusion material 33 that has a function of occluding NOx. Noble metal 32 is a metal such as platinum (Pt). NOx occluding material 33 is formed from several of the following: alkali metals such as potassium (K), sodium (Na), lithium (Li), and cesium (Cs); alkali earth metals such as barium (Ba), and calcium (Ca); and rare earths such as lanthanum (La) and yttrium (Y). According to the oxygen concentration in the exhaust gas, the NOx purification catalyst unit will either initiate NOx occlusion, or initiate NOx release and at the same time purify the released NOx.

In addition, as shown in FIG. 11, in the case of combustion equipment such as regular diesel engines or lean-burn gasoline engines, the exhaust gas contains oxygen (0$_2$), and the air/fuel ratio of the exhaust gas is lean. In cases where the exhaust gas is lean, carrying noble metal 32 will through its oxidation catalytic function oxidize any nitric oxide (NO) exhausted from the engine into nitrogen dioxide ($NO_2$), using the oxygen contained in the exhaust gas. The nitrogen dioxide will then be occluded as nitrate in the NOx occlusion material 33 with NOx occlusion function, such as barium. Through this process the exhaust gas is purified of NOx.

However, if this process does continue, the NOx occlusion material 33 with NOx occlusion functions is completely converted into nitrate, and the material will lose its NOx occlusion functions. This process can be corrected by changing the operating conditions of the engine, or by injecting fuel into the exhaust passage, whereby a rich spike of gas is produced and sent to the catalyst. This exhaust gas is characterized by a lack of oxygen in the gas itself, a high concentration of carbon monoxide (CO), and a high exhaust temperature.

In addition, as shown in FIG. 12, by providing the exhaust gas with rich air/fuel states, in which the exhaust gas contains no oxygen and has a high concentration of carbon monoxide and an elevated exhaust temperature, the nitrate made from occluded NOx will release nitrogen dioxide and revert to its original substance, such as barium. Since no oxygen exists in the exhaust gas, this released nitrogen dioxide will be reduced and purified by the oxidizing functions of the carrying noble metal 32. More specifically, the nitrogen dioxide will be reduced into water ($H_2O$), carbon dioxide ($CO_2$), and nitrogen gas ($N_2$), with the carbon monoxide, carbon hydride (HC), and hydrogen ($H_2$) in the exhaust gas acting as reducing agents.

For that reason, in an exhaust gas purification system with a NOx purification catalyst unit carrying a NOx occlusion reduction type catalyst, a rich control performs regeneration operations to restore the NOx occlusion functions when the estimated NOx occlusion amount reaches the NOx saturation amount. This rich control renders the air/fuel ratio of the exhaust gas richer and lowers the oxygen concentration in inflowing exhaust gas, thereby inducing adsorbed NOx to be released and subsequently reduced by the noble metal catalyst.

It is necessary for the rich control to suppress the substances used as reducing agents from escaping, such as HC, from being released unused into the atmosphere, while at the same time completely reducing the NOx released by the rich control. Therefore, the oxygen concentration downstream of the NOx purification catalyst unit carrying the NOx occlusion reduction type catalyst is monitored, and the air/fuel ratio of the rich control and the like is controlled.

In practice, however, a small amount of HC escapes since HC reactions in the vicinity of the stoich (theoretical air/fuel ratio) is less than adequate and the air/fuel ratio control is delayed. To correct this problem, an internal combustion engine exhaust gas purification system has been proposed wherein, for example, an oxidation catalyst unit containing an oxygen occlusion-release agent is disposed downstream of a NOx purification catalyst unit that does not contain an oxygen occlusion-release agent, as described in Japanese Patent Application Kokai Publication No. 2001-227333. As a result of this configuration, HC escaped from the NOx purification catalyst unit is oxidized through the oxidation catalyst unit, thereby preventing the release of any unused HC into the atmosphere.

On the other hand, as described in Japanese Patent Application Kokai Publication No. 2001-323812, for example, there exists an integral type exhaust gas purification device wherein an NOx purification catalyst unit and an oxidation catalyst unit are disposed in a single container. In this device, an oxygen concentration sensor is disposed between the NOx purification catalyst unit and the oxidation catalyst unit. In usual configurations, the sensor is disposed around the circumference of the container.

In this case, as shown in FIG. 13, the exhaust gas purification device 50X comprises an anterior oxidation catalyst unit 51 and a posterior oxidation catalyst unit 53 disposed in the same container anterior and posterior to a NOx purification catalyst unit 52 carrying a NOx occlusion reduction type catalyst. In the device 50X the anterior oxidation catalyst unit 51 induces temperature elevation of the exhaust gas and $NO \rightarrow NO_2$ activation. Also the posterior oxidation catalyst unit 53 removes by oxidation the substances unconsumed as reducing agents in the rich control such as HC and CO. In this configuration, an oxygen concentration sensor 55 such as an air/fuel ratio sensor is disposed downstream of the oxidation catalyst unit 53.

In the case of this configuration, after the rich control completes NOx release and reduction using the NOx purification catalyst unit 52, the oxygen occlusion-release agent (e.g., ceria: CeO) in the oxidation catalyst unit 53 will consume the remaining oxygen, requiring the longer rich period. Therefore the rich control, no longer contributing to the regeneration of the NOx oxidation catalyst unit 52, remains in operation more than is necessary. As a result, it creates problems such as reduced fuel efficiency and the release of substances like HC and CO unconsumed as reducing agents.

In order to prevent these problems, an exhaust gas purification device 50Y is configured as shown in FIG. 14, such that the oxygen concentration sensor 55 is disposed upstream of the oxidation catalyst unit 53. In this configuration, the exhaust gas flows quickly in the center of the container, and slowly around the circumference. In other words, the change of air/fuel ratio is more sluggish around the circumference than in the center, and consequently the responsibility of the oxygen concentration sensor is reduced. For that reason, the rich control performs in excess for the amount of delay time due to the reduced responsibility. As a result, it creates problems such as deteriorating fuel consumption and the release of substances like HC and CO unconsumed as reducing agents. Therefore, this layout is unsuitable for air/fuel ratio control.

For an example of a proposal which has taken up the issue of the disposition of the oxygen concentration sensor, refer to Japanese Patent Application Kokai Publication No. 2002-89245, wherein an exhaust gas purification system for internal combustion engine is proposed. In the system described in the above publication, a throttle section in the form of a tube constricts exhaust gas flow between the upstream catalytic unit and downstream catalytic unit, and in this throttle section is disposed the oxygen sensor. This configuration, however, cannot be applied to an integral type catalytic converter wherein the catalytic units are housed in a single container.

SUMMARY OF THE INVENTION

The present invention was devised to solve the problems described above. Namely, the object of the present invention is to provide a guide structure that improves the responsibility of an exhaust gas sensor in a catalytic container installed in an exhaust passage, wherein a plurality of exhaust gas purification units are disposed in series in the catalyst container, and wherein the exhaust gas sensor is installed between the exhaust gas purification units.

In addition, the object of the present invention is particularly to provide an exhaust gas purification device in an exhaust gas purification system that uses a NOx purification catalyst unit carrying a NOx occlusion reduction type catalyst and an oxidation catalyst unit in order to purify exhaust gas of NOx contained therein, wherein exhaust gas flow is directed and guided to the installation point of an oxygen concentration sensor, and wherein the response of the oxygen concentration sensor installed in the exhaust gas purification device is improved.

The above objects are achieved by a guide structure which guides exhaust gas flow to an exhaust gas sensor in an exhaust gas purification device, wherein a plurality of exhaust gas purification units are disposed in series in the container of the exhaust gas purification device installed in an exhaust passage, and wherein the exhaust gas sensor is installed between the exhaust gas purification units.

As a result of this guide structure, exhaust gas flow is directed to the exhaust gas sensor, thus markedly improving the sensor's responsibility to the changes in the exhaust gas. Consequently, the variety of control mechanisms that are conducted based on the output of the exhaust gas sensor, are able to operate accurately and without a time delay.

It should be appreciated that the exhaust gas purification unit includes catalytic units such as NOx purification catalyst units and oxidation catalyst units, as well as catalyzed and non-catalyzed DPF units. In addition, the NOx purification catalyst unit carries catalysts such as NOx occlusion reduction type catalysts, selective catalytic reduction (SCR catalysts), and direct catalytic reduction NOx purification catalysts (DCR catalysts). The exhaust gas sensor includes a variety of sensors such as $O_2$ (oxygen) concentration sensors, NOx (nitrogen oxides) concentration sensors, $NH_3$ (ammonia) concentration sensors, and exhaust gas temperature sensors.

Additionally, the objects of the invention described above are achieved by an exhaust gas purification device wherein both the NOx purification catalyst unit and the oxidation catalyst unit following downstream of the NOx purification catalyst unit are disposed in the same container. The NOx purification catalyst unit carries a NOx occlusion reduction type catalyst in which NOx is occluded in the case where the air/fuel ratio is lean and in which occluded NOx is released and at the same time reduced in the case where the air/fuel ratio is rich. Furthermore, the exhaust gas purification device is of an integral type and includes an oxygen concentration sensor disposed between the NOx purification catalyst unit and the oxidation catalyst unit, and incorporates a guide structure that guides exhaust gas flow to the oxygen concentration sensor.

The exhaust gas purification device is an integral type, by which is meant an exhaust gas purification device in which the NOx purification catalyst unit and the oxidation catalyst unit are housed in a single container. The device incorporates a NOx purification catalyst unit carrying a NOx occlusion reduction type catalyst and an oxidation catalyst unit, which act as exhaust gas purification units, and further incorporates an oxygen concentration sensor, which acts as an exhaust gas sensor.

As a result of the configuration of a device installed with the guide structure, exhaust gas flow is directed to the oxygen concentration sensor, thus markedly improving the sensor's responsibility to the change of the air/fuel ratio in the exhaust gas. Therefore, the rich control can be made to terminate with the completion of the NOx reduction. Consequently, the supply of substances such as HC used for reduction in the rich control can be limited to the minimum necessary amount. As a result, fuel efficiency can be improved, and the escape of unused HC and CO can be prevented.

Additionally, in the exhaust gas purification device described above, the guide structure is configured such that on the inlet side, the guide structure provides an exhaust gas inlet disposed eccentric from the center of the cross section of the container to the opposite side of the oxygen concentration sensor. On the outlet side, the guide structure provides an exhaust gas outlet disposed eccentric from the center of the cross section of the container to the same side as the oxygen concentration sensor. In other words, by devising the piping configuration at the inlet and outlet of the exhaust gas purification device (converter), exhaust gas flow is made to pass closely to the oxygen concentration sensor. At the same time this layout also provides a means to lower the ground clearance of the exhaust gas purification device. Thus, although the disposition of the converters is conventionally configured so as to make exhaust gas enter the central axis, in the present device exhaust gas enters from the lower side of the converters and is exhausted from the upper side of the converters, thereby allowing the lower side of the device to be installed higher than devices configured according to the conventional art.

As a result of this configuration, since exhaust gas in the container of the integral type exhaust gas purification device flows obliquely from the inlet to the outlet periphery, the gas flows across the oxygen concentration sensor installed between the inlet and outlet. As a result, the exhaust gas sensor's response to the change of the air/fuel ratio in the exhaust gas is markedly improved.

Furthermore, in the guide structure described above, an inlet-side exhaust pipe connected to the exhaust gas inlet is formed such that it is attached to incline toward the axis of the exhaust gas purification device, so as to make exhaust gas flow in the direction of the oxygen concentration sensor. According to this configuration, the direction of exhaust gas flow entering the container of the integral type exhaust gas purification device is oriented in the direction of the oxygen concentration sensor. Thus, exhaust gas flows more reliably across the oxygen concentration sensor. As a result, the exhaust gas sensor's response to the change of the air/fuel ratio in the exhaust gas is markedly improved.

In addition, the configuration of the guide structure is characterized by the installation of at least a guide plate such that exhaust gas is made to flow in the direction of the oxygen concentration sensor. The at least a guide plate is installed in the exhaust gas passage in the interior of the exhaust gas purification device, and are installed in at least the upstream side and downstream side of the NOx purification catalyst unit. In other words, the at least a guide plate (a baffle plate) guiding exhaust gas flow to the oxygen concentration sensor are installed in at least one of the following locations: at the inlet of the exhaust gas purification device, upstream of the NOx purification catalyst unit, or downstream to the NOx purification catalyst unit.

As a result of this configuration, the flow of exhaust gas can be easily guided to the oxygen concentration sensor by at least a guide plate of extremely simple construction.

In addition, the guide structure is characterized by the cross section of the exhaust gas purification device being formed in the flattened shape, and the oxygen concentration sensor is installed in the direction of the flattening of the flattened shape. As a result of this configuration, the oxygen concentration sensor can be disposed either in the center or its vicinity of the container, and thereby the exhaust gas can be guided easily to the oxygen concentration sensor. It should be appreciated that elliptical shapes, rectangular shapes, or other such shapes can be incorporated as the flattened shape.

Furthermore, the form of the guide structure is configured such that the attachment portion of the oxygen concentration sensor is installed so as to protrude into the center of the exhaust gas purification device container. Since exhaust gas flows easily through the center of the container, the exhaust gas can be easily guided to the oxygen concentration sensor.

Additionally, a configuration similar to the above described which yields similar advantages can be achieved even in the case of an exhaust gas purification device wherein a diesel particulate filter(DPF) is installed instead of the oxidation catalyst unit.

The configuration described above represents a converter layout that emphasizes the responsibility of an oxygen concentration sensor disposed downstream of a NOx purification catalyst unit. Therefore, it is possible to displace exhaust gas flow and bring the oxygen concentration sensor closer to the mainstream of an exhaust gas. As a result, the speed of the oxygen concentration sensor's response to the change of the air/fuel ratio can be increased, particularly during the operation of the rich control.

Furthermore, the responsibility of exhaust gas sensors such as NOx sensors, except oxygen concentration sensors, can be increased by similar devisal. Alternatively, in the case where a NOx purification catalyst unit carrying a urea type selective catalytic reduction (SCR catalyst) is incorporated, a $NH_3$ concentration sensor presumed to be used is disposed between the SCR catalyst and the $NH_3$ anti-escape diesel oxidation catalyst (DOC) unit posterior to it. Also in this case the similar devisal can increase its responsiveness.

The configuration of the guide structure according to the present invention is such that, exhaust gas flow is guided to the exhaust gas sensor. Consequently, since exhaust gas flow is directed to the exhaust gas sensor, the sensor's responsibility to the change of the exhaust gas is markedly improved. As a result, the variety of control mechanisms that are performed based on the output of exhaust gas sensors are able to operate accurately and without a time delay.

Moreover, the configuration of the exhaust gas purification device according to the present invention is such that, the responsibility of an oxygen concentration sensor disposed downstream of a NOx purification catalyst unit carrying a NOx occlusion reduction type catalyst can be made faster. Therefore, the rich control can be made to terminate with the completion of the NOx release and reduction performed by the rich control. As a result, the supply of substances such as HC used for reduction in the rich control can be limited to the minimum necessary amount. Furthermore, fuel efficiency can be improved, and the escape of unused HC and CO can be prevented.

DESCRIPTION OF THE EMBODIMENTS

Hereinafter, the embodiments of the exhaust gas purification device according to the present invention will be described with reference to the drawings.

Figure 1:
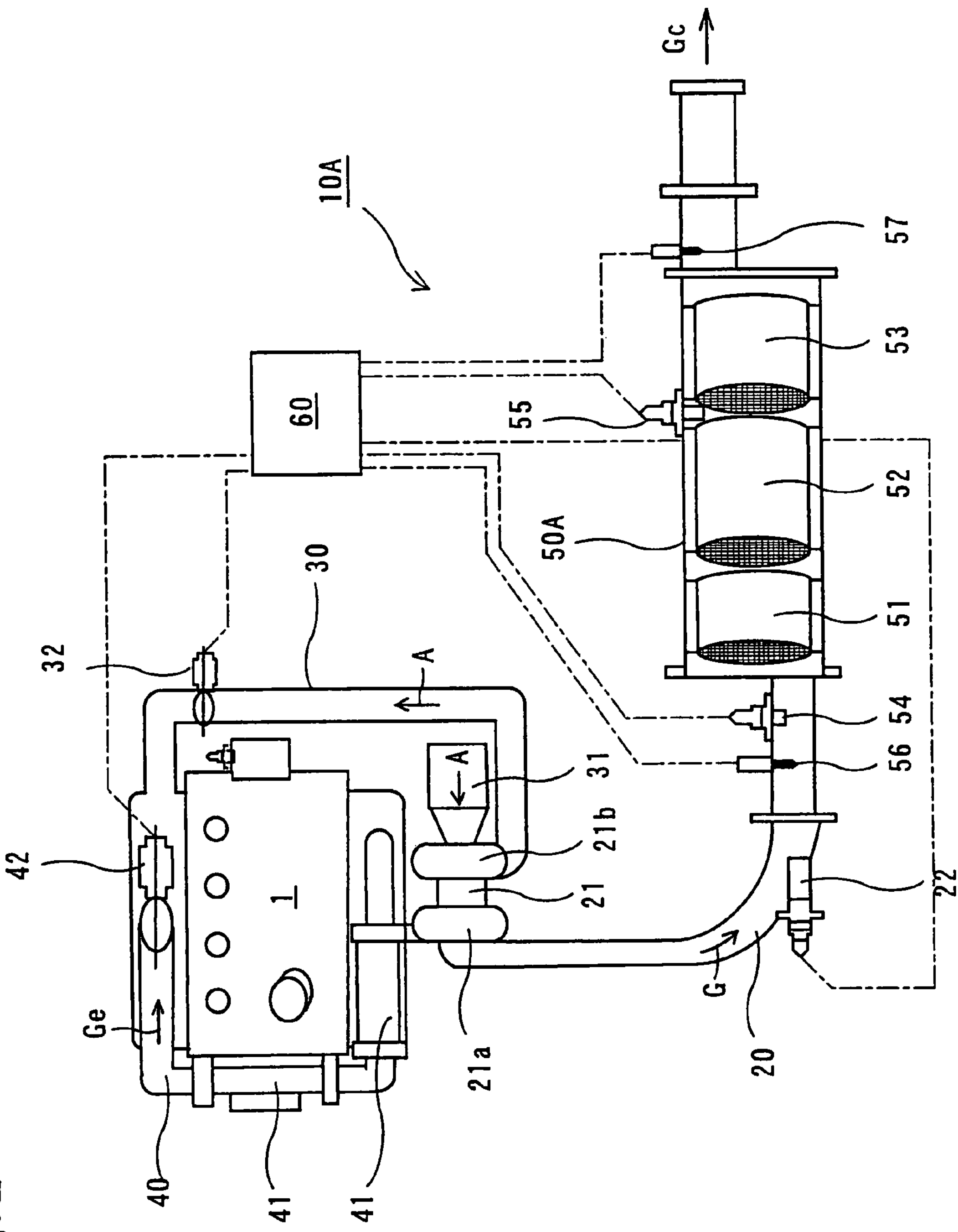
FIG. 1 shows the configuration of an exhaust gas purification device and an exhaust gas purification system providing this exhaust gas purification device according to the first embodiment.

The exhaust gas purification system 10A shown in FIG. 1 provides an exhaust gas purification device 50A according to the first embodiment of the present invention and is configured such that the exhaust gas purification device 50A is disposed in the exhaust passage 20 of an engine (internal combustion engine) 1.

This exhaust gas purification device 50A according to the first embodiment is formed as an integral type exhaust gas purification device, and is configured by an anterior oxidation catalyst unit 51, a NOx purification catalyst unit 52 carrying a NOx occlusion reduction type catalyst, and a posterior oxidation catalyst unit 53, all housed in the same container.

The anterior oxidation catalyst unit 51 and the posterior oxidation catalyst unit 53 are formed such that a porous ceramic honeycomb carrying body carries an oxidation catalyst such as platinum (Pt). The purpose of the anterior oxidation catalyst unit 51 is to elevate the temperature of the exhaust gas flowing into the NOx purification catalyst unit 52 downstream, and to improve the NOx occlusion efficiency by promoting $NO \rightarrow NO_2$ activity. The purpose of the posterior oxidation catalyst unit 53 is to prevent the outflow (escape) of the substances such as HC into the atmosphere by oxidizing them during the rich control to regenerate the NOx purification catalyst unit 52 downstream.

The NOx purification catalyst unit 52 is formed of a monolith catalyst, to the carrying body of which a catalyst coat layer such as aluminum oxide or titanium oxide is applied. Carried on this catalyst coat layer are noble metal catalysts (catalyst metals), such as platinum (Pt) (Pd), and NOx occlusion materials (NOx occlusion substances) such as barium (Ba).

When the oxygen concentration of the exhaust gas in the NOx purification catalyst unit 52 is high (a lean air/fuel ratio state), the NOx occlusion materials occlude the NOx in the exhaust gas. Through this process, the exhaust gas is purified of NOx. Alternatively, when the oxygen concentration of the exhaust gas is low or zero, occluded NOx is released and at the same time the released NOx is reduced by the catalytic action of the noble metal catalysts. Through this process, NOx in exhaust gas is prevented from flowing out into the atmosphere.

An exhaust pipe fuel addition valve 22 is installed upstream of the NOx purification catalyst unit 52. During the regeneration control, the exhaust pipe fuel addition valve 22 receives fuel from a line not shown in the figure and supplies it in the exhaust gas, where it is used as a reducer for NOx. With this supply of fuel the air/fuel ratio of the exhaust gas is rendered smaller than the theoretical air/fuel ratio, a highly rich state.

In addition, a feedback control regulates the supply of reducer in the NOx occlusion reduction type catalyst regeneration control of the NOx purification catalyst unit 52. The feedback control regulates the reducer supply such that the oxygen concentration in exhaust gas flowing into the NOx purification catalyst unit 52 approaches the oxygen concentration of a target air/fuel ratio (or alternatively an excess air ratio λ). To accomplish this, a catalyst inlet λ (excess air ratio) sensor 54, an oxygen concentration sensor, is installed on the inlet side of the exhaust gas purification device 50A. Furthermore, a NOx catalyst outlet λ sensor 55, an oxygen concentration sensor to detect oxygen concentration, is installed downstream of the NOx purification catalyst unit 52 and upstream to the posterior oxidation catalyst unit 53. An excess air ratio sensor of which the output changes near the stoich (theoretical air/fuel ratio) are significantly large and which can easily and accurately determine the termination of oxygen release is adopted for the NOx catalyst outlet λ sensor 55.

The excess air ratio sensor detects the oxygen concentration in exhaust gas. The sensor consists of a thin platinum layer applied to a zirconia element surface. The sensor works as an air battery due to the difference in the oxygen concentration between the exhaust gas and the atmosphere. Additionally, the sensor has the characteristic of changing its electromotive force to Z-type upon reaching the theoretical air/fuel ratio.

In addition, a catalyst inlet exhaust gas temperature sensor 56 is disposed on the inlet side of the exhaust gas purification device 50A to detect the catalyst temperature. Furthermore, a catalyst outlet exhaust gas temperature sensor 57 is disposed on the outlet side of the exhaust gas purification device 50A. A turbine 21*a* of a turbocharger 21 is also disposed in the exhaust passage 20 upstream of the exhaust gas purification device 50A.

At the same time, a mass air flow sensor (MAF sensor) 31, a compressor 21*b* of the turbocharger 21, and an intake throttle valve 32 are installed in an intake passage 30. Additionally, an EGR passage 40 is installed connecting the exhaust passage 20 upstream of the turbine 21*a* and the intake passage 30. An EGR cooler 41 and an EGR valve 42 are installed in the EGR passage 40.

In addition, a control device (ECU: engine control unit) 60 is installed to perform general controls over the operation of the engine 1, as well as to perform the NOx purification function regeneration control for the NOx occlusion reduction type catalyst in the NOx purification catalyst unit 52. The control device 60 receives detection values input from devices such as the catalyst inlet λ sensor 54, the NOx catalyst outlet λ sensor 55, the catalyst inlet exhaust gas temperature sensor 56, and the catalyst outlet exhaust gas temperature sensor 57. In addition, the control device 60 outputs signals controlling devices in the engine 1 such as the EGR valve 42, a fuel-injection valve of an electronically-controlled common rail fuel-injection device for fuel injection, and the intake throttle valve 32.

In the exhaust gas purification system 10A, air A passes through the mass air flow sensor (MAF sensor) 31 in the intake passage 30, then through the compressor 21*b* of the turbocharger 21. The air A is then adjusted for quantity by the intake throttle valve 32 before entering the cylinders. Exhaust gas G generated in the cylinders drives the turbine 21*a* of the turbocharger 21 in the exhaust passage 20. The exhaust gas G subsequently passes through the exhaust gas purification device 50A, becoming a purified exhaust gas Gc which is exhausted into the atmosphere via a silencer not shown in the figure. Additionally, a portion of the exhaust gas G passes through the EGR cooler 41 in the EGR passage 40 as an EGR gas Ge. The EGR gas Ge is subsequently adjusted for quantity by the EGR valve 42 and is recirculated into the intake passage 30.

Figure 2:
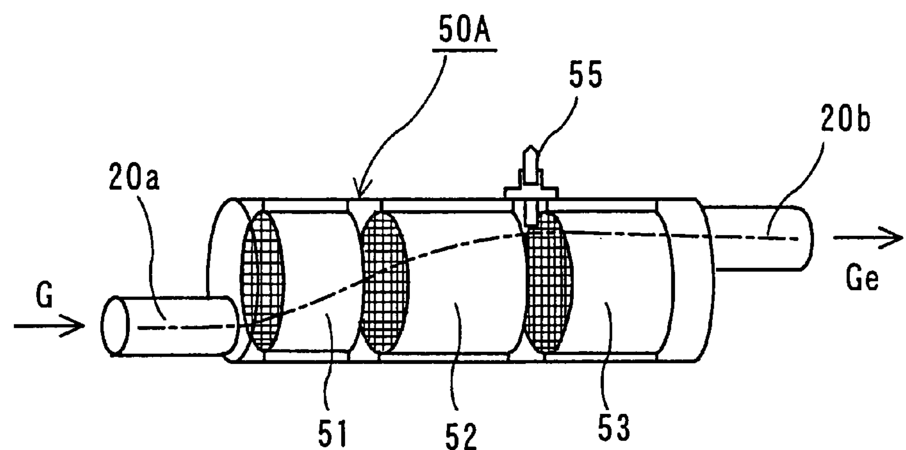
FIG. 2 shows the configuration of an exhaust gas purification device according to the first embodiment.

In addition, the exhaust gas purification device 50A according to the first embodiment of the present invention incorporates a guide structure to guide exhaust gas flow to the NOx catalyst outlet λ sensor (oxygen concentration sensor) 55. The guide structure is incorporated according to the following configuration. FIGS. 1 and 2 show how, on the inlet side of the exhaust gas purification device 50A, an exhaust gas inlet is installed at a position eccentric from the center of the cross sectional of the container to the opposite side of the NOx catalyst outlet λ sensor 55. The exhaust gas inlet connects to an inlet pipe 20*a*. Likewise, on the outlet side, an exhaust gas outlet is installed at a position eccentric from the center of the cross section of the container to the same side as the NOx catalyst outlet λ sensor 55. An outlet pipe 20*b* connects to the exhaust gas outlet. As a result of this configuration, exhaust gas flow is directed to the NOx catalyst outlet λ sensor 55, thus markedly improving the sensor's responsibility to the change of the air/fuel ratio in the exhaust gas.

Figure 3:
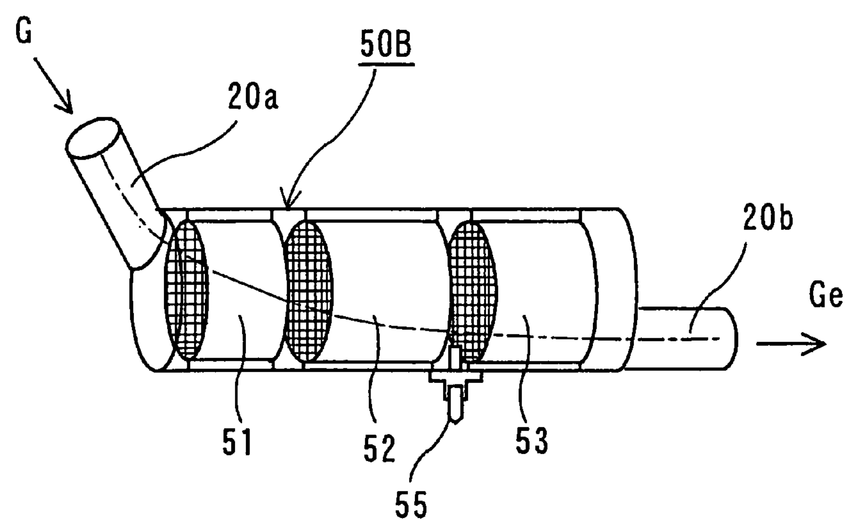
FIG. 3 shows the configuration of an exhaust gas purification device according to the second embodiment of the invention.

Additionally, FIG. 3 shows how an exhaust gas purification device 50B according to the second embodiment of the present invention incorporates a guide structure for guiding exhaust gas flow to the NOx catalyst outlet λ sensor (oxygen concentration sensor) 55. The guide structure is incorporated according to the following configuration. In addition to the configuration described in the first embodiment, this configuration is furthermore formed such that, the inlet exhaust pipe 20*a* connected to the exhaust gas inlet is attached to incline toward the axis of the exhaust gas purification device 50B, so as to make exhaust gas flow in the direction of the NOx catalyst outlet λ sensor 55.

As a result of this configuration, the flow direction of the exhaust gas G entering the interior of the container of the integral type exhaust gas purification device 50B is oriented in the direction of the NOx catalyst outlet λ sensor 55 from the first. Thus, the exhaust gas flows more reliably across the NOx catalyst outlet λ sensor 55 and consequently, the sensor's response to the change of the air/fuel ratio in the exhaust gas is markedly improved.

Figure 4:
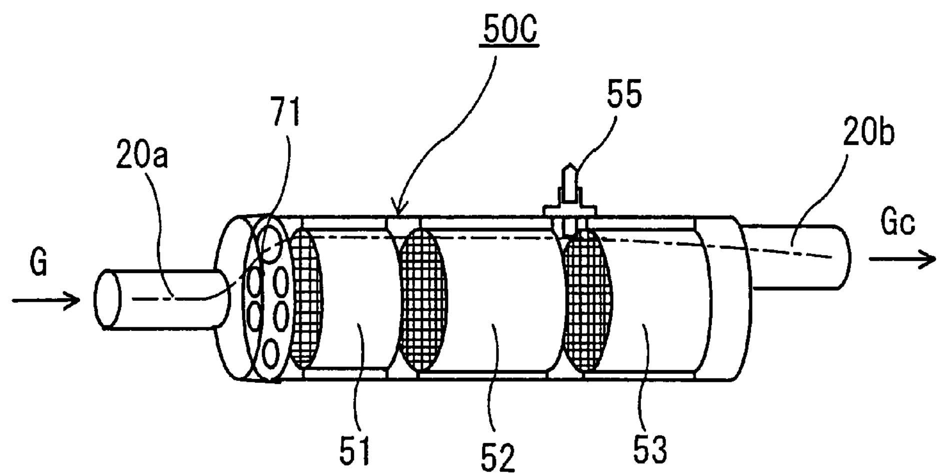
FIG. 4 shows the configuration of an exhaust gas purification device according to the third embodiment.
Figure 5:
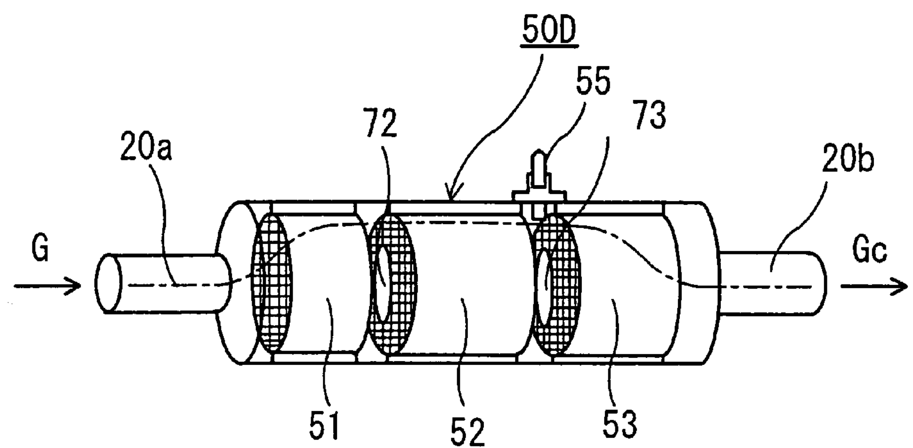
FIG. 5 shows another configuration of an exhaust gas purification device according to the third embodiment.

Additionally, FIGS. 4 and 5 show how an exhaust gas purification device 50C according to the third embodiment of the present invention incorporates a guide structure for guiding exhaust gas flow to the NOx catalyst outlet λ sensor (oxygen concentration sensor) 55. The guide structure is incorporated according to the following configuration. Guide plates 71, 72, and 73 are installed such that exhaust gas is made to flow in the direction of the NOx catalyst outlet λ sensor 55. The guide plates are installed in the exhaust gas passage in the interior of the exhaust gas purification device 50C, and are installed in at least the upstream side or downstream side of the NOx purification catalyst unit 52 carrying a NOx occlusion reduction type catalyst.

FIG. 4 shows how a perforated guide plate (baffle plate) 71, installed in the vicinity of the inlet of the exhaust gas purification device 50C, guides exhaust gas flow to the outer side of the exhaust passage in the exhaust gas purification device 50C, and thus guides exhaust gas flow to the NOx catalyst outlet λ sensor 55. Alternatively, FIG. 5 shows how exhaust gas guide plates (baffle plates) 72 and 73, installed at the cross sectional center of the exhaust passage upstream or downstream of the NOx purification catalyst unit 52, impede exhaust gas flowing into the center of the NOx purification catalyst unit 52 and/or the oxidation catalyst unit 53. Thus, exhaust gas flow is guided into the outer circumference of the NOx purification catalyst unit 52 and/or the oxidation catalyst unit 53, and guide to the NOx catalyst outlet λ sensor 55.

Figure 6:
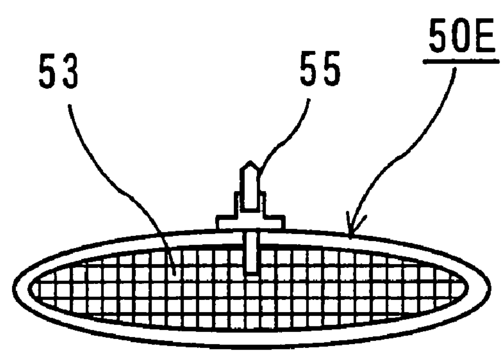
FIG. 6 shows the configuration of an exhaust gas purification device according to the fourth embodiment.

Additionally, FIG. 6 shows how an exhaust gas purification device 50E according to the fourth embodiment of the present invention incorporates a guide structure for guiding exhaust gas flow to the NOx catalyst outlet λ sensor (oxygen concentration sensor) 55. The guide structure is incorporated according to the following configuration. The cross section of the exhaust gas purification device 50E being formed in the flattened shape, in this embodiment an ellipsoid shape, and the NOx catalyst outlet λ sensor 55 is installed in the direction of the flattening of the flattened shape, that is to say, in the direction of the minor axis of the ellipse. As a result of this configuration, the NOx catalyst outlet λ sensor 55 can be disposed either in the center or its vicinity of the container, and thereby the exhaust gas can be guided easily to the NOx catalyst outlet λ sensor 55. It should be appreciated that the flattened shape can include the incorporation of shapes other than elliptical shapes, such as rectangular shapes or other shapes.

Figure 7:
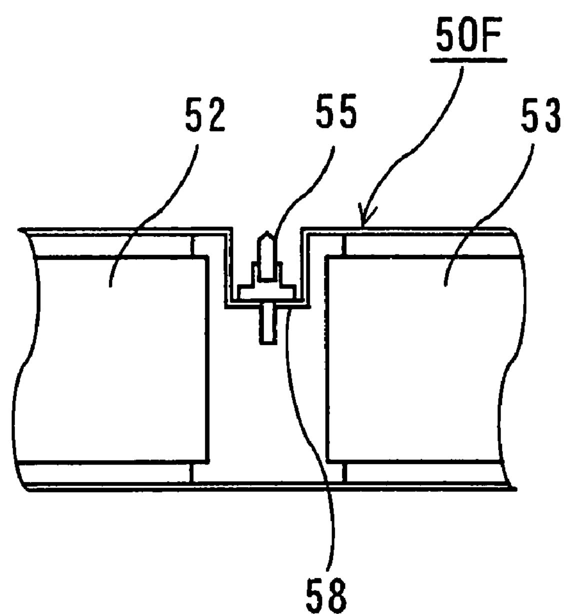
FIG. 7 shows the configuration of an exhaust gas purification device according to the fifth embodiment.
Figure 8:
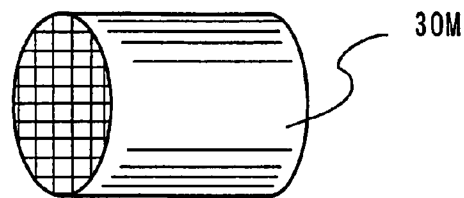
FIG. 8 shows a monolith honeycomb.
Figure 9:
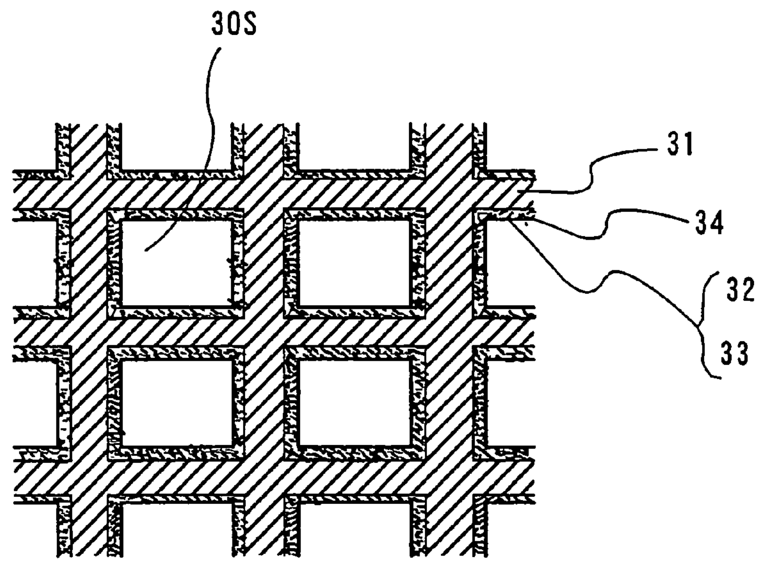
FIG. 9 is a partial enlarged view of a monolith honeycomb.
Figure 10:
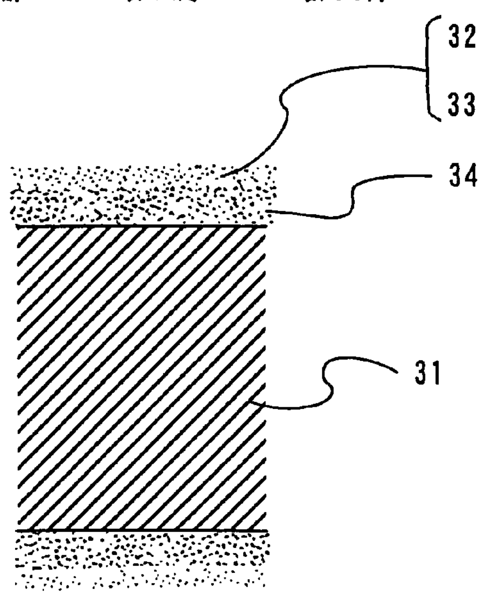
FIG. 10 is an enlarged view of a monolith honeycomb cell wall.
Figure 11:
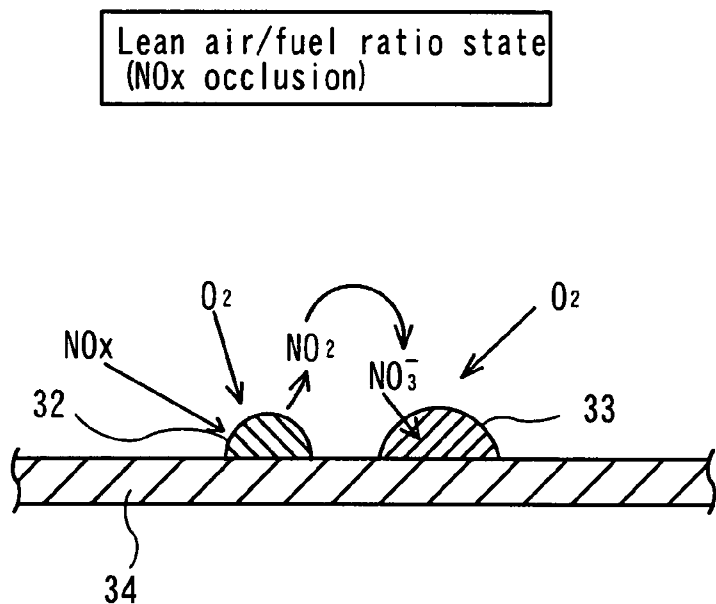
FIG. 11 shows the configuration of a NOx purification catalyst unit carrying a NOx occlusion reduction type catalyst, and diagrammatically shows the purification mechanism during a lean control.
Figure 12:
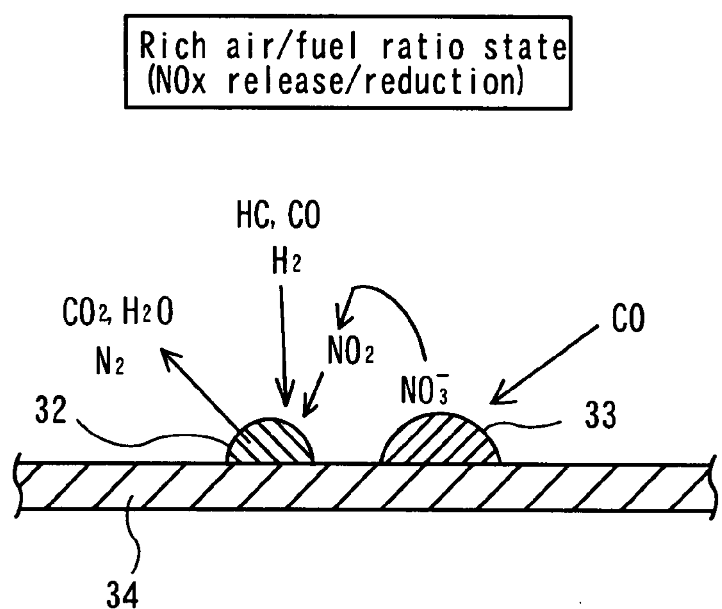
FIG. 12 shows the configuration of a NOx purification catalyst unit carrying a NOx occlusion reduction type catalyst, and diagrammatically shows the purification mechanism during a rich control.
Figure 13:
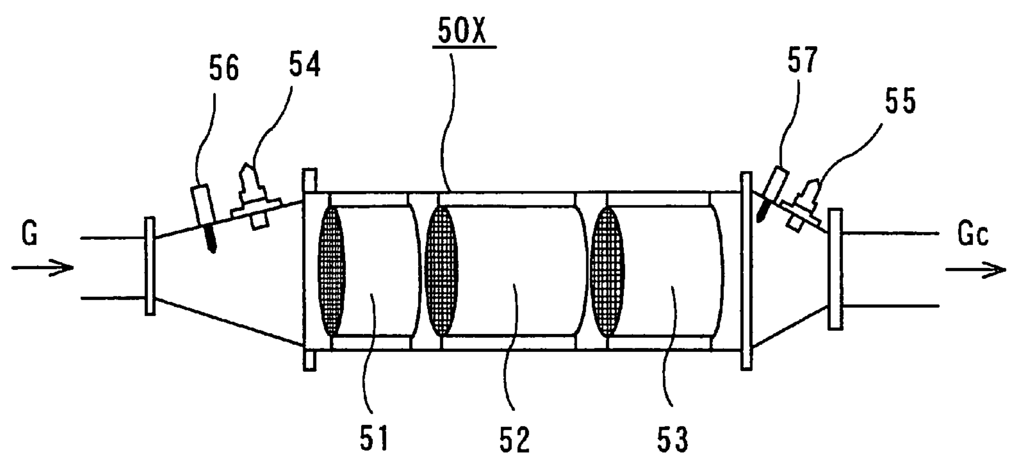
FIG. 13 shows the configuration of an exhaust gas purification device according to the conventional art.
Figure 14:
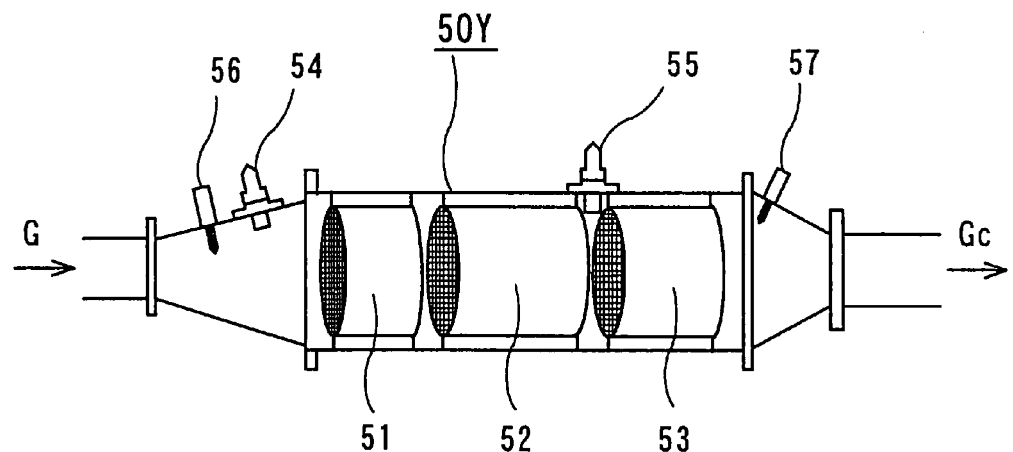
FIG. 14 shows another configuration of an exhaust gas purification device according to the conventional art.

Additionally, FIG. 7 shows how an exhaust gas purification device 5OF according to the fifth embodiment of the present invention incorporates a guide structure for guiding exhaust gas flow to the NOx catalyst outlet λ sensor (oxygen concentration sensor) 55. The guide structure is incorporated according to the following configuration. An attaching portion 58 of the NOx catalyst outlet λ sensor 55 is installed so as to protrude into the center of the container of the exhaust gas purification device 50F. As a result of this configuration, the NOx catalyst outlet λ sensor 55 can be disposed either in the center or the vicinity of the container, and thereby the exhaust gas can be guided easily to the NOx catalyst outlet λ sensor 55.

The configurations of these exhaust gas purification devices 50A to 50F are such that, guide structures for the purpose of guiding exhaust gas flow to the NOx catalyst outlet λ sensor 55 are installed, whereby exhaust gas flow is directed the NOx catalyst outlet λ sensor 55. Then the sensor's response to the change of the air/fuel ratio can be improved. Consequently, the NOx regeneration rich control, which restores NOx occlusion function, can be made to terminate almost simultaneous with the completion of NOx release and reduction. As a result, the supply of substances such as HC used for reduction by the rich control can be limited to the minimum necessary amount. Therefore, fuel efficiency can be improved, and the escape of HC and CO unused in NOx reduction can be prevented.

Moreover, a configuration similar to the above described which can yield similar advantages can be achieved even in the case of an exhaust gas purification device wherein a diesel particulate filter (DPF) is installed instead of the posterior oxidation catalyst unit 53.

The foregoing description of an exhaust gas purification unit has been presented wherein a NOx purification catalyst unit carrying a NOx occlusion reduction type catalyst, an oxidation catalyst unit carrying an oxidation catalyst, and an oxygen concentration sensor acting as an exhaust gas sensor were used for the purposes of illustration and description. It should be appreciated that in addition to the foregoing description, an exhaust gas purification member includes but is not limited to catalyst units carrying a NOx purification catalyst, oxidation catalyst or the like, and DPF units such as catalytic and non-catalytic DPFs. Furthermore, it should be appreciated that a NOx purification catalyst includes but is not limited to NOx occlusion reduction type catalysts, selective catalyst reduction (SCR catalysts), and direct catalytic reduction type NOx purification catalysts (DCR catalysts). Furthermore, it should be appreciated that an exhaust gas sensor encompasses a variety of sensors, including but not limited to NOx (nitrogen oxides) concentration sensors, $NH_3$ (ammonia) concentration sensors, and exhaust gas temperature sensors.

Additionally, as a result of the guide structure described above, an exhaust gas purification device implementing these exhaust gas purification units will be characterized by exhaust gas flow being directed to an exhaust gas sensor, thus markedly improving the sensor's responsibility to the change of the exhaust gas. Consequently, the variety of control mechanisms that are performed based on the output of this exhaust gas sensor will be able to operate accurately and without a time delay.

The beneficial effects of the guide structure and exhaust gas purification system of the present invention described above are highly useful for but not limited to the processing of exhaust gases emitted by the internal combustion engine found onboard automobiles. The present invention can also be highly effective as a guide structure and exhaust gas purification system for the processing of exhaust gases emitted by a variety of sources, including various industrial machinery, stationary combustion engine, factories, and power plants.

What is claimed is:

1. A guide structure for guiding exhaust gas flowing in an exhaust gas purification device installed in an exhaust passage, comprising:

a plurality of exhaust gas purification units disposed in series in a container of the exhaust gas purification device, wherein the container includes a central axis and a wall, and a first space is formed between an exterior of a wall of the plurality of exhaust gas purification units and an interior of the wall of the container, and wherein each of the plurality of exhaust gas purification units is positioned coaxially with the container;

an exhaust gas sensor installed between the exhaust gas purification units; and a guide plate without openings being positioned at an inlet of at least one of the plurality of exhaust purification units substantially perpendicular to the central axis, wherein a second space is formed between an outer periphery of the plate and an interior of the wall of the at least one of the plurality of the purification units, and wherein the plate prevents the passage of exhaust gas into a center of the at least one of the plurality of the exhaust gas purification units, and diverts the exhaust gas to flow into the second space, and into the first space and to the sensor.

2. An exhaust gas purification device, comprising:

a NOx purification catalyst unit carrying a NOx occlusion reduction type catalyst for occluding NOx in the case where the air/fuel ratio of exhaust gas is lean and for releasing and reducing NOx occluded in the case where the air/fuel ratio of exhaust gas is rich;

an oxidation catalyst unit disposed downstream of the NOx purification catalyst unit, the oxidation catalyst unit and the NOx purification catalyst unit being disposed in the same container, wherein the container includes a central axis and a wall, and a first space is formed between an exterior of a wall of the catalyst units and an interior of the wall of the container, and wherein each of the plurality of exhaust gas purification units is positioned coaxially with the container;

an oxygen concentration sensor disposed between the NOx purification catalyst unit and the oxidation catalyst unit, and a guide plate without openings being positioned at an inlet of at least one of the catalyst units substantially perpendicular to the central axis, wherein a second space is formed between an outer periphery of the plate and an interior of the wall of the at least one of the plurality of the purification units, and wherein the plate prevents the passage of exhaust gas into a center of the at least one of the catalyst units, and diverts the exhaust gas to flow into the second space, and into the first space and to the sensor.

3. The exhaust gas purification device according to claim 2, further comprising an exhaust gas inlet installed at a position eccentric from the central axis of the container on a side of the container opposite the oxygen concentration sensor, and an exhaust gas outlet installed at a position eccentric from the central axis of the container on a same side of the container as the oxygen concentration sensor.

4. The exhaust gas purification device according to claim 2, further comprising an inlet exhaust pipe which is attached to the container to incline toward the central axis of the container, so as to make exhaust gas flow in a direction of the oxygen concentration sensor.

5. The exhaust gas purification device according to claim 2, wherein said guide plate is installed in both an upstream side and a downstream side of the NOx purification catalyst unit, so as to make exhaust gas flow in a direction of the oxygen concentration sensor.

6. The exhaust gas purification device according to claim 2, wherein the container is cylindrical, the wall has a flattened portion and the oxygen concentration sensor is installed in the flattened portion.

7. The exhaust gas purification device according to claim 2, wherein an attachment portion of the oxygen concentration sensor is installed so as to protrude the sensor toward a center of the container of the exhaust gas purification device.

8. An exhaust gas purification device comprising:

a NOx purification catalyst unit carrying a NOx occlusion reduction type catalyst for occluding NOx in the case where the air/fuel ratio of exhaust gas is lean and for releasing and reducing NOx occluded in the case where the air/fuel ratio of exhaust gas is rich;

a diesel particulate filter unit disposed in the downstream of the NOx purification catalyst unit, the diesel particulate filter and the NOx purification catalyst unit being disposed in the same container, wherein the container includes a central axis, and an outer wall, and a space is formed between an exterior of a wall of the catalyst unit and the diesel particulate filter unit and an interior of the wall of the container;

wherein each of the plurality of exhaust gas purification units is positioned coaxially with the container;

an oxygen concentration sensor disposed between the NOx purification catalyst unit and the diesel particulate filter; and a guide plate without openings being positioned at an inlet of at least one of the catalyst unit and the filter substantially perpendicular to the central axis, wherein a second space is formed between an outer periphery of the plate and an interior of the wall of the at least one of the units, and wherein the plate prevents the passage of exhaust gas into a center of the at least one of the units, and diverts the exhaust gas to flow into the second space, and into the first space and to the sensor.

* * * * *